(12) United States Patent
Shinoda

(10) Patent No.: US 7,437,288 B2
(45) Date of Patent: Oct. 14, 2008

(54) SPEECH RECOGNITION APPARATUS

(75) Inventor: Koichi Shinoda, Tokyo (JP)

(73) Assignee: NEC Corporation, Tokyo (JP)

( * ) Notice: Subject to any disclaimer, the term of this patent is extended or adjusted under 35 U.S.C. 154(b) by 739 days.

(21) Appl. No.: 10/093,915

(22) Filed: Mar. 11, 2002

(65) Prior Publication Data
US 2002/0184020 A1    Dec. 5, 2002

(30) Foreign Application Priority Data
Mar. 13, 2001    (JP)    ............... 2001-070108

(51) Int. Cl.
G10L 15/08    (2006.01)
(52) U.S. Cl. ............ 704/240; 704/231; 704/256; 704/256.1; 704/256.2; 704/256.3; 704/256.4; 704/256.5; 704/256.6
(58) Field of Classification Search ............ 704/62, 704/257, 243, 254, 238, 240, 231, 256, 256.1, 704/256.2, 256.3, 256.4, 256.5, 256.6
See application file for complete search history.

(56) References Cited

U.S. PATENT DOCUMENTS

| | | | |
|---|---|---|---|
| 4,903,305 A | | 2/1990 | Gillick et al. |
| 5,243,686 A | * | 9/1993 | Tokuda et al. ............ 704/200 |
| 5,263,120 A | * | 11/1993 | Bickel ...................... 706/62 |
| 5,708,759 A | * | 1/1998 | Kemeny .................... 704/254 |
| 5,787,394 A | * | 7/1998 | Bahl et al. ................. 704/238 |
| 5,806,030 A | | 9/1998 | Junqua |
| 5,937,385 A | * | 8/1999 | Zadrozny et al. ......... 704/257 |
| 5,956,676 A | * | 9/1999 | Shinoda .................... 704/244 |
| 5,960,396 A | * | 9/1999 | Shinoda .................... 704/243 |
| 6,064,958 A | * | 5/2000 | Takahashi et al. ......... 704/243 |
| 6,141,641 A | | 10/2000 | Hwang et al. |
| 6,173,076 B1 | | 1/2001 | Shinoda |
| 6,246,982 B1 | * | 6/2001 | Beigi et al. ............... 704/238 |

FOREIGN PATENT DOCUMENTS

| | | |
|---|---|---|
| EP | 0 572 335 A2 | 12/1993 |
| EP | 0 802 523 A2 | 10/1997 |
| JP | 06-214591 | 8/1994 |
| JP | 2531073 | 6/1996 |

(Continued)

OTHER PUBLICATIONS

Casey et al., Decision Tree Design Using a Probabilistic Model, Jan. 1984, IEEE Transactions on Information Theory, vol. 30, No. 1, pp. 93-99.*

(Continued)

Primary Examiner—Rlchemond Dorvil
Assistant Examiner—Qi Han
(74) Attorney, Agent, or Firm—Foley & Lardner LLP (57) ABSTRACT

A speech recognition apparatus using a probability model that employs a mixed distribution, the apparatus formed by a standard pattern storage means for storing a standard pattern; a recognition means for outputting recognition results corresponding to an input speech by using the standard pattern; a standard pattern generating means for inputting learning speech and generating the standard pattern; and a standard pattern adjustment means, provided between the standard pattern generating means and the standard pattern storage means, for adjusting the number of element distributions of the mixed distribution of the standard pattern.

14 Claims, 2 Drawing Sheets

FOREIGN PATENT DOCUMENTS

| | | |
|---|---|---|
| JP | 08-211889 | 8/1996 |
| JP | 09-081178 | 3/1997 |
| JP | 09288492 | 11/1997 |
| JP | 10149192 | 6/1998 |
| JP | 11-143486 | 5/1999 |
| JP | 3009640 | 12/1999 |
| JP | 3088357 | 7/2000 |

OTHER PUBLICATIONS

Barron et al., The minimum description length principle in coding and modeling, Oct. 1998, IEEE Transactions on Information Theory, vol. 44, No. 6, pp. 2743-2760.*

Merhav et al. "A minimax classification approach with application to robust speech recognition", IEEE Transactions on Speech and Audio Processing, Jan. 1993, p. 90-100.*

Deller et al. "Discrete-time processing of speech signal", ISBN 0-02-328301-7, p. 39-40.*

T. S. Han et al., "Mathematical Principle of Information and Coding", Iwanami Shoten, Publishers, pp. 249-275, 1994.

Rabiner & Juang, "Fundamentals of Speech Recognition", Prentice Hall, pp. 102-187, 1993.

Rabiner & Juang, "Fundamentals of Speech Recognition", Prentice Hall, pp. 321-389.

T. Watanabe, "Problems and solutions of building voice recognition systems," Journal of the IEICE, Institute of Electronics, Information and Communications Engineers, 1996, vol. J790D-II, No. 12, pp. 2022-2031.

* cited by examiner

SPEECH RECOGNITION APPARATUS

BACKGROUND OF THE INVENTION

1. Field of the Invention

The present invention relates to a method for generating standard patterns for pattern recognition using a mixture model, and more particularly to a speech recognition apparatus using a hidden Markov model (HMM) using Gaussian mixtures (or Guassian mixed distribution) as an output probability distribution.

2. Related Art

In recent years research has been conducted with regard to machine recognition of speech patterns, and various methods have been proposed. Of these, a typical method is one using a hidden Markov model (HMM). Speaker-independent speech recognition systems, which recognize any speaker's voice, using a hidden Markov model have been the subject of active research and development.

A speech recognition system is described below using the hidden Markov model example, with reference shown in FIG. 2. The voice of a speaker input to a speech recognition apparatus is input to an input pattern generating means 101, and subjected to such processing as A/D conversion and voice analysis. Then the processed voice is converted into a time series of feature vectors on a basis of a unit of a predetermined time length called a frame.

The time series of the feature vectors is here referred to as an input pattern. The frame length is normally in the approximate range from 10 ms to 100 ms.

Feature vectors are extraction of the quantity of features of voice spectra which are in general 10 to 100 dimensions.

The HMM is stored in a standard pattern storage means 103. The HMM is one of the models of voice information sources, and parameters of which can be learned by using a speaker's voice. The method of recognition with regard to the HMM is described here in detail, and the HMM is in general prepared for each recognition unit.

Here, a phoneme is taken as an example of a recognition unit. For example, in a speaker-independent speech recognition system, a speaker-independent HMM created by learning the voices of a large number of speakers is used as the HMM in a standard pattern storage means 103.

A word HMM is used in a recognition means 104 to perform recognition of the input patterns.

HMM is a model of voice information sources which adopt a statistical idea into description of standard patterns in order to cope with variations in voice patterns.

A detailed description of the HMM is detailed in "Fundamentals of Speech Recognition", Rabiner and Juang, 1993 Prentice Hall (hereinafter referred to as reference 1).

HMM of each phoneme is made up of 1 to 10 states and state transitions therebetween. In general, a starting state and an ending state are defined. At every unit time, symbols are output at each state to cause state transition.

Voice of each phoneme is represented as a time series of symbols output from HMM during the states transitions from the starting state to the ending state.

The occurrence probability of a symbol in each state and the transition probability between each of the states are defined.

Transition probability parameters represent temporal variations of speech patterns.

Output probability parameters represent variations of speech patterns in tone of voice.

With a probability of a starting state fixed to a certain value, by multiplying occurrence probability and transition probability at each state transition, a probability of occurrence of a speech generated from the model can be obtained.

Conversely, when a speech is observed, assuming the speech is generated from a certain HMM, its occurrence probability can be calculated. In voice recognition by HMM, HMM is prepared for each candidate recognition target, and when a speech is input, an occurrence probability is obtained in each HMM, an HMM in which the probability is the highest is determined as a generation source and a candidate recognition target corresponding to the HMM is taken as a recognition result.

As output probability parameters, there are the discrete probability distribution expression and continuous probability distribution expression, with the continuous probability distribution expression being used in the example here.

In the continuous probability distribution expression, mixed continuous distribution, that is, distribution obtained by adding a plurality of Gaussian distributions with weights, is often used.

In the following example, the output probability is expressed by a mixed continuous probability distribution.

Parameters such as output probability parameter, transition probability parameter and weights of a plurality of Gaussian distributions are learned in advance by the algorithm called Baum-Welch Algorithm, which provides a learning voice corresponding to a model.

For example, consider the case in which recognition is to be performed of 1000 words, this being the case in which a single correct word is to be determined from among 1000 word recognition candidates.

First, in the case of word recognition, the HMMs for each phoneme are linked so as to generate the HMMs for the recognition candidate words.

In the case of 1000-word recognition, the word HMMs for 1000 words are generated. An input pattern O expressed as a time series of feature vectors is represented as Equation (1) below.

$$O = o_1, o_2, o_3, \ldots, o_t, \ldots o_T \quad (1)$$

In the above, T represents the total number of frames of an input pattern.

Candidate recognition target words are denoted as W1, W2, ..., WN, where N represents the number of candidate recognition target words.

Matching between a word HMM for each word Wn and an input pattern O is carried out using the following procedure. In the following, suffix N will be omitted unless it is necessary.

First, with respect to a word HMM, transition probability from a state j to a state i is represented as $a_{ji}$, mixed weight of an output probability distribution is represented as $c_{im}$, a mean vector of each element Gaussian distribution is represented as $\mu_{im}$, and covariance matrix is represented as $\Sigma_{im}$. Here, t represents an input time, i and j represent a state of HMM and m represents a mixed element number.

Then, the following recurrence formulas with regard to the forward probability $\alpha_t(i)$ will be operated.

This forward probability $\alpha_t(i)$ is the probability of the state i existing at time t when the partial observed time series $o_1$, $o_2$, ..., $o_t$ is output.

$$\alpha_t(i) = \pi_i \ (i=1,2,\ldots,I) \quad (2)$$

$$\alpha_{t+1}(i) = \sum_j \alpha_t(j) a_{ji} b_i(O_{t+1}) \ (i = 1, 2, \ldots, I; t = 1, \ldots, T) \quad (3)$$

In the above, $\pi$ represents a probability of the initial state being i.

In Equation (3) $b_i(O_{t+1})$ is defined by the following equations (4) and (5).

$$b_i(O_t) = \sum_m c_{im} N\left(O_t; \mu_{im}, \sum_{im}\right) \quad (4)$$

$$N(O_t; \mu_{im}, \Sigma_{lm}) = (2\pi)^{-k/2} |\Sigma_{lm}|^{-1/2} \exp(-(\mu_{lm} - O_t)\Sigma^{-1}(\mu_{lm} - O_t)/2) \quad (5)$$

In Equation (5), K is the dimension of the input frame and the mean vector.

The likelihood of an input pattern for the word Wn is obtained by the following equation (6).

$$P^n(X) = \alpha_T(I) \quad (6)$$

In Equation (6), I is the ending state.

This processing is performed for each word model, and a recognition result word Wn for the input pattern X is determined from the following Equation (7) (in which a hat is placed over n).

$$\hat{n} = \arg\max_n P^n(X) \quad (7)$$

The recognition result word Wn is sent to the recognition result output section. The recognition result output section outputs the recognition result to a screen or outputs a control command responsive to the recognition result to other units.

The standard pattern generating means 102 is described below. In the case of speaker-independent recognition, the standard pattern generating means 102 accumulates the speech of a large number of speakers beforehand and performs parameter prediction by using these speech samples for parameter prediction.

First, a backward probability is derived from Equation (8) and Equation (9).

$$\beta_T(i) = 1 \ (i = 1, \ldots, N) \quad (8)$$

$$\beta_t(i) = \sum_{j=1}^N a_{ij} b_j(O_{t+1}) \beta_{t+1}(j) \ (t = T-1, T-2, \ldots, 1; i = 1, \ldots, N) \quad (9)$$

In Equation (9) $\beta_t(i)$ is the probability, given the time t and the state i, of a partially observed time sequence from the time t+1 up to the ending state.

Using the forward probability and the backward probability, the probability, given an observed sequence O, that state i exists at time t is given by the following equation (10).

$$\gamma_t(i) = \frac{\alpha_t(i)\beta_t(i)}{\sum_{i=1}^I \alpha_t(i)\beta_t(i)} \quad (10)$$

The probability that state i exists at time t and state j exist at time t+1 is given by Equation (11).

$$\xi_{t(i,j)} = \frac{\alpha_t(i) a_{ij} b_j(O_{t+1}) \beta_{t+1}(j)}{\sum_{i=1}^I \sum_{j=1}^I \alpha_t(i) a_{ij} b_j(O_{t+1}) \beta_{t+1}(j)} \quad (11)$$

In the case of a mixed Gaussian distribution, the probability that a k-th state i exists in the mixed elements at time t (the occupying frequency) is given by the following Equation (12).

$$\gamma'(i, k) = \frac{\alpha_t(i)\beta_t(i)}{\sum_{i=1}^I \alpha_t(i)\beta_t(i)} \times \frac{c_{ik} N\left(O_t, \mu_{ik}, \sum_{ik}\right)}{\sum_{m=1}^M c_{im} N\left(O_t, \mu_{im}, \sum_{im}\right)} \quad (12)$$

Based on the foregoing equations, the prediction values $\pi$, $\alpha$, $\mu$, $\Sigma$, and c are given by Equations (13) through (17).

$$\pi = \gamma_1(i) \quad (13)$$

$$\overline{a}_{ij} = \frac{\sum_{t=1}^{T-1} \xi_t^{i,j}}{\sum_{t=1}^{T-1} \gamma_t^i} \quad (14)$$

$$\overline{c}_{jk} = \frac{\sum_{t=1}^T \gamma_t'(j, k)}{\sum_{t=1}^T \gamma_t(j)} \quad (15)$$

$$\overline{\mu}_{jk} = \frac{\sum_{t=1}^T \gamma_t'(j, k) O_t}{\sum_{t=1}^T \gamma_t'(j, k)} \quad (16)$$

$$\overline{\sum}_{jk} = \frac{\sum_{t=1}^T \gamma_t'(j, k)(O_t - \mu_{jk})(O_t - \mu_{jk})^t}{\sum_{t=1}^T \gamma_t'(j, k)} \quad (17)$$

In the Baum-Welch algorithm, parameters are updated based on these prediction values, and the updated parameters are used to further and repeatedly predict the prediction values.

At each iteration, it has been proven that the probability of performing recognition of the observed sequence increases.

The foregoing is an example of using the HMM, which was used in the past.

As described above, there are discrete distribution expression and continuous distribution expression as representations of output probability.

Of the two distribution expressions, the continuous distribution expression, and the mixed Gaussian distribution expression in particular is often used.

The reason for using the mixed Gaussian distribution is that it provides superior performance in expressing the output probability distribution.

In the case of using the mixed Gaussian distribution (herein referred to simply as the mixed distribution) there is no clear-cut guide as to how many element distributions should be made.

In a mixed distribution HMM, it is usual to take the number of element distributions for each state as being constant for all states, and to test with different numbers of element distributions, selecting the number of element distributions that has the best performance from thereamong.

However, it can be expected that the required number of element distributions will differ, depending upon the state.

For example, if an unnecessarily large number of element distributions are made, this leads to an increase in the amount of calculation required to calculate the probability of the element distribution.

For a state having a low probability of occurrence, in the process of parameter prediction there is a possibility of a deterioration of performance with regard to unknown data, for which over-learning is done.

Therefore, it is desirable that the number of element distributions at each state of a mixed distribution HMM be optimized for each state.

The simplest method of optimizing the number of element distributions for each state is that of performing recognition experiments as the number of element distributions is changed for each state, and selecting the number of element distributions with the highest recognition performance for each state.

Because the overall number of HMM states is very great, this being usually from 1000 to 10000 the optimization of the number of element distributions for each state is virtually impossible from the standpoint of the amount of calculation that is required.

Accordingly, it is an object of the present invention, given the above-described background, to provide a speech recognition apparatus which performs adjustment of the number of element distributions effectively and at a high speed in a probability model using a mixed distribution.

SUMMARY OF THE INVENTION

To achieve the above-noted objects, the present invention adopts the following basic technical constitution.

The first aspect of the present invention is a speech recognition apparatus using a probability model that employs a mixed distribution, the apparatus comprising: a standard pattern storage means for storing a standard pattern; a recognition means for outputting recognition results corresponding to an input speech by using the standard pattern; a standard pattern generating means for inputting learning speech and generating the standard pattern; and a standard pattern adjustment means, provided between the standard pattern generating means and the standard pattern storage means, for adjusting the number of element distributions of the mixed distribution of the standard pattern.

The second aspect of the present invention is a speech recognition apparatus using a probability model that employs a mixed distribution, the apparatus comprising: a standard pattern storage means for storing a standard pattern; a recognition means for outputting recognition results corresponding to an input speech by using the standard pattern; a standard pattern modification means for inputting speech for adaptation and modifying the standard pattern; and a standard pattern adjustment means for adjusting the number of element distributions of the mixed distribution of the standard pattern.

In the third aspect of the present invention, the standard pattern adjustment means comprising: a tree structure generating means for generating a tree structure of an element distribution, and an element distribution selection means for selecting a distribution response to learning data input to the standard pattern generating means.

In the fourth aspect of the present invention, the standard pattern adjustment means having a minimax distribution selection means for selecting an element distribution by using a minimax method.

In the fifth aspect of the present invention, the element distribution selection means uses an amount of learning data corresponding to each element distribution as a criterion in selection of element distributions.

In the sixth aspect of the present invention, the element distribution selection means uses a minimum description length as a criterion in selection of element distributions.

In the seventh aspect of the present invention, the element distribution selection means uses an Akaike information criterion as a criterion in selection of element distributions.

In the eighth aspect of the present invention, the tree structure generating means uses divergence as a inter-distribution distance in selection of element distributions.

In the ninth aspect of the present invention, the tree structure generating means uses a likelihood with respect to learning data as an inter-distribution distance.

In the tenth aspect of the present invention, a hidden Markov model is used as the probability model.

DETAILED DESCRIPTION OF THE PREFERRED EMBODIMENTS

Embodiments of the present invention are described in detail below, with reference made to relevant accompanying drawings.

Figure 1:
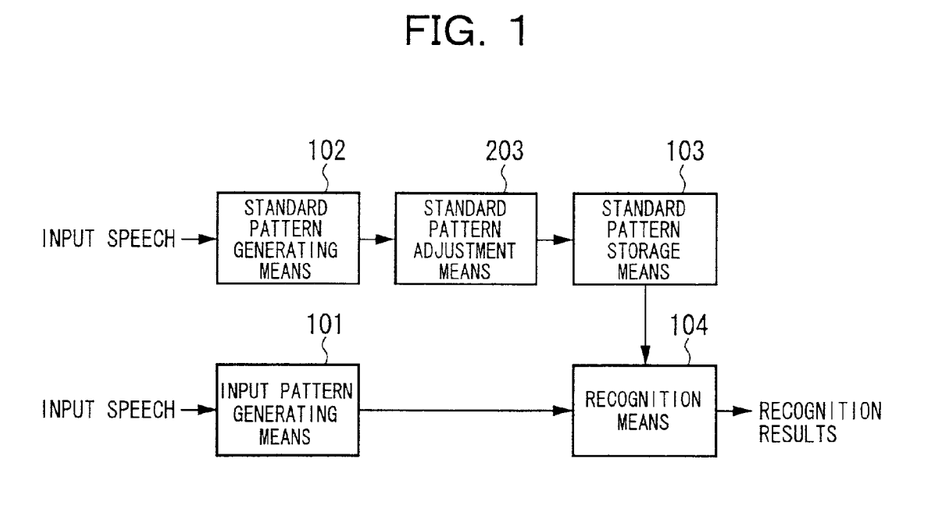
FIG. 1 is a block diagram showing the configuration of a speech recognition apparatus according to an embodiment of the present invention.
Figure 2:
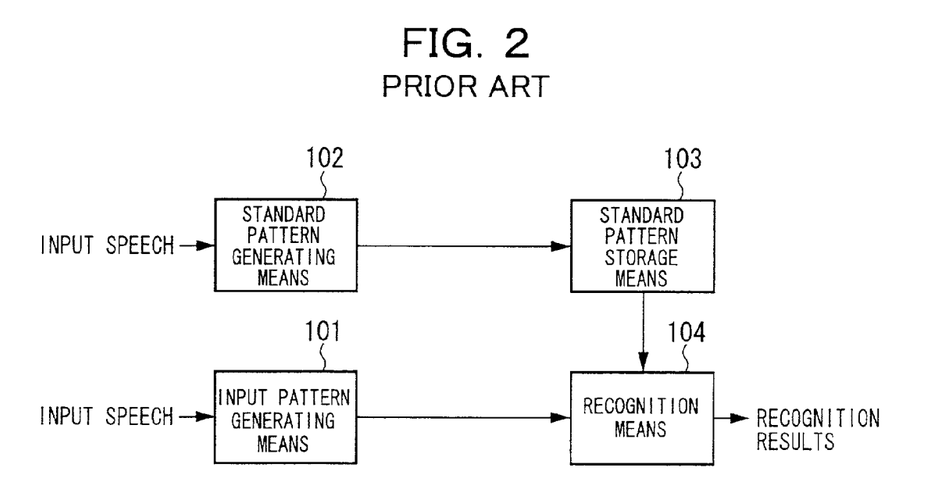
FIG. 2 is a block diagram showing the configuration of a conventional speech recognition apparatus.

FIG. 1 is a block diagram showing the configuration of a speech recognition apparatus according to an embodiment of the present invention, which differs from the conventional configuration shown in FIG. 2 in that there is a standard pattern adjustment means 203 provided between the standard pattern generating means 102 and the standard pattern storage means 103. In the blocks of the speech recognition apparatus shown in FIG. 1, elements similar to blocks shown in FIG. 2 (the input pattern generating means 101, the standard generating means 102, the standard pattern storage means 103, and the recognition means 104) have been assigned the same reference numerals, and are not described in detail.

In these drawings, the input pattern generating means 101 generates an input pattern from input speech (an audio signal generated by a speaker). The standard pattern generating means 102 generates standard patterns, as described for the case of prior art.

The standard pattern adjustment means 203 changes the number of element distributions of a generated standard pattern.

The standard pattern storage means 103 stores generated standard patterns, and the recognition means 104 performs recognition of an input speech using standard patterns, and outputs a recognition result.

Figure 3:
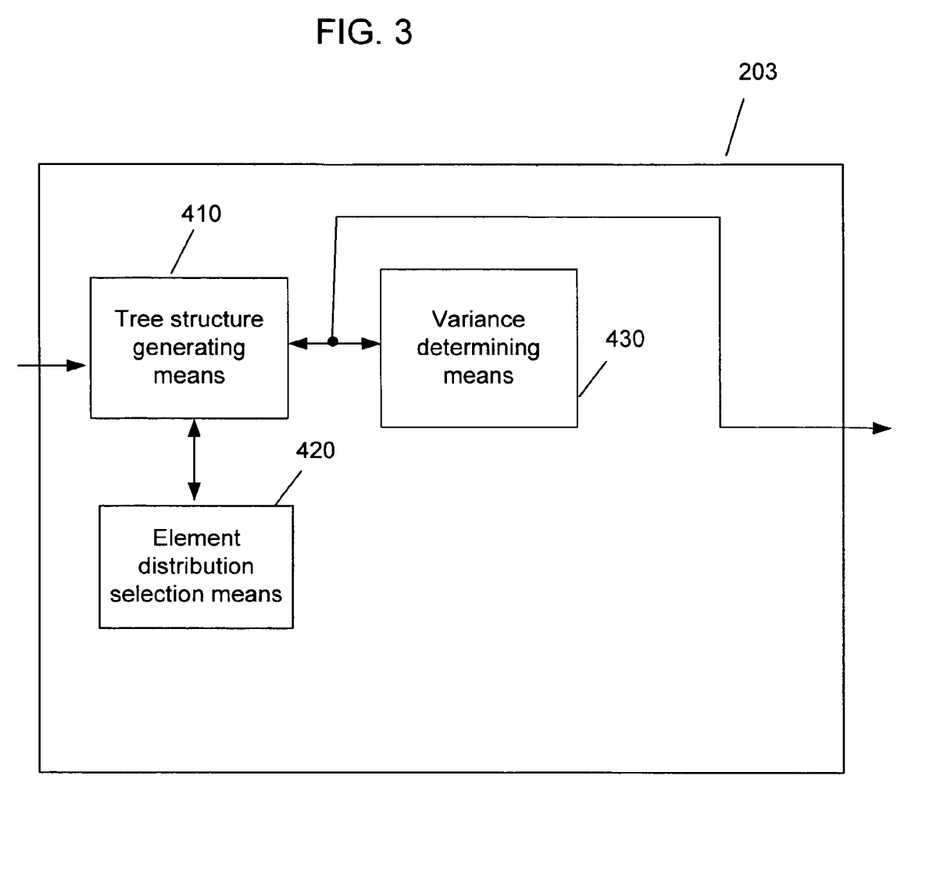
FIG. 3 is a block diagram showing components of the standard pattern adjustment means according to an embodiment of the invention.

An embodiment of the present invention is described in detail below, with regard to the operation of the standard pattern adjustment means 203, which is a feature added over the conventional art. FIG. 3 is a block diagram showing elements of the standard pattern adjustment means 203: a tree structure generating means 410, an element distribution selection means 420, and a variance determining means 430.

The problem of optimizing the number of element distributions for states of the hidden Markov model (HMM) can be treated as the problem of selecting a probability model that is optimized with respect to the given data.

In this selection of a probability model, a variety of amount of information criteria have been proposed in the past.

Consider this embodiment, which uses the minimum description length, which is one such criterion, as a method of optimizing the number of distributions.

First, from recent information theory and computational learning theory research, the minimum description length (MDL) criterion has been proven effective in the problem of selecting an optimum probability model with respect to data.

The minimum description length criterion is described in "Mathematical Principle of Information and Coding" (T. S. Han and Kingo Kobayashi, Iwanami Shoten, Publishers (1994) (hereinafter referred to as reference 2), on pages 249 to 275. Similar to the AIC (Akaike information criterion), this is a criterion that is an implementation of the idea concept that a good model is one that is as simple as possible while expressing the given data faithfully.

The MDL criterion is a criterion that takes as the optimum model of the probability models $i=1, \ldots, I$, a model giving the minimum description length, with respect to data $s=s1, \ldots, sN$. In this case, the minimum description length I MDL (i) with respect to a probability model is given as shown in Equation (18).

$$I_{MDL(i)} = -\log P_{\hat{\theta}(i)}(X^N) + \frac{\alpha_i}{2}\log N + \log I \quad (18)$$

In the above, $\alpha_i$ is the dimension of the model i (number of free parameters), $\theta(i)$ is the likelihood prediction value of the free parameter $\theta^{(i)}=(\theta_1^{(i)}, \ldots, \theta_{\alpha_i}^{(i)})$ of a model i predicted using data $X^N$.

In the above Equation (18), the first term is an amount gotten by applying a negative sign to the logarithmic likelihood with respect to data (hereinafter referred to as the likelihood), the second term is an amount expressing the complexity of the model, and the third term is the description length necessary for selecting the model i.

In this manner, because the more complex the model becomes, the larger becomes the likelihood with respect to data, thereby the first term decreases.

As the model becomes complex, the number of free parameters increases, so that the value of the second term increases.

In this manner, there is a tradeoff relationship between the first term and the second term, and it is expected that the description length I MDL (i) takes a minimum value for a model with the appropriate complexity.

An algorithm for optimizing the number of element distributions for each state using this MDL criterion is as described below.

First, the usual procedure is used to perform mixed Gaussian distribution HMM learning using learning data.

When doing this, the number of element distributions is kept constant for all states, and an HMM is learned by increasing the number of element distributions up to a number that is thought to be an upper limit.

The occupying frequency $\gamma'_t(i, k)$ is stored for each element distribution during the learning process. In this expression, i is the state subscript, and k is the subscript of the element distribution in that state.

Next, the standard pattern adjustment means 203 performs optimization of the number of element distributions for each individual state. Hereafter, the description is for only a particular state i, enabling the omission of the subscript i. The standard pattern adjustment means 203 performs the same processing with respect to the other states as well.

First, the standard pattern adjustment means 203, by means of the tree structure generating means thereof, generates a tree structure of the element distributions for each individual state. The root thereof is a single distribution, and the leaves are each of the element distributions.

When this is done, while various methods can be envisioned for generating the tree structure of the element distributions, in this case a bifurcated tree is created using a k-means algorithm.

The Kullback divergence is used as the distance between element distributions (inter-distribution distance). This Kullback divergence can be easily calculated from the mean and covariance of the Guassian distribution.

With regard to the method of generating a tree structure of element distributions, there is a detailed description in Japanese Patent No. 002531073 and the above-noted reference 2.

Next, the standard pattern adjustment means 203 determines the variance of the distributions at each node of the tree structure (node distributions)

The variance of the node distributions is determined from the occupying frequency and Gaussian distribution parameters of the distributions of all leaves which govern this variance.

A set of node distributions dividing the tree structure between top and bottom parts is referred to as a cut. While there are a large number of cuts, each of the cuts represents a probability model for the state thereof. In this case, consider the determination of the optimum cut using the MDL criterion.

For example, the minimum description length for a given cut U is calculated as shown below. In this case the node distributions making up the cut are taken as $S1, \ldots SM$, where M is the number of node distributions making up the cut.

By doing this, the likelihood L (Sm) with respect to the data distribution Sm is approximated by the Equations (19) and (20).

$$L(S_m) = \sum_{t=1}^{T} \sum_{S \in S_m} \log\left(N\left(O_t, \mu_{Sm}, \sum_{Sm}\right)\right) \gamma_t(S) \quad (19)$$

$$= -\frac{1}{2}\left(\log((2\pi)^K|\sum|) + K\right)\Gamma(S_m)$$

In Equation (19), $$\Gamma(S_m) = \sum_{t=1}^{T} \sum_{S \in S_m} \gamma_t(S) \quad (20)$$

where S is the leaf distribution of all leaves beneath the distribution Sm, and K is dimension of the mean vector and covariance matrix used as the shared standard pattern.

In Equation (19), $\mu_{Sm}$ and $\Sigma_{Sm}$ are the mean vector and covariance matrix, respectively of the distribution Sm.

By using the results described above, it is possible to express the description length I (U) of the cut U as shown in Equation (21).

$$I(U) = \sum_{m=1}^{M} L(S_m) + \frac{1}{2} \times 2KM \log \sum_{m=1}^{M} \Gamma(S_m) \quad (21)$$

$$= \frac{1}{2} \sum_{m=1}^{M} \Gamma(S_m) \log \left( \left| \sum S_m \right| \right) + KM \log V +$$

$$\frac{K}{2}(1 + \log(2\pi)) \times V$$

In Equation (21)

$$V = \sum_{m=1}^{M} \Gamma(S_m) \quad (22)$$

in which V is a quantity corresponding to the total number of frames of data corresponding to U, this being constant and not dependent upon the division.

The standard pattern adjustment means 203 calculates the description length I(U) for all possible cuts, and selects a cut having the minimum I(U) value.

In doing this, the number of types of possible divisions, that is, the number of cuts U is usually very large. Given this, by using an algorithm as noted below, it is possible to save calculation time when performing calculation to select a cut U. The method of optimizing the number of element distributions for each state p is as follows.

First, a node is generated with respect to a state p, this node being called the root node. The distribution parameters of the root node are predicted from all data samples corresponding to all distributions to this state.

For example, for a bifurcated tree structure, a root node distribution of $S_0$, the two child distributions thereof being $S_1$ and $S_2$, the amount of change in the description length at the time of expansion from the root nod to the child nodes is given by Equation (23).

$$\Delta = I(S_1, S_2) - I(S_0) \quad (23)$$

$$= \frac{1}{2} \left( \Gamma(S_1) \log \left| \sum\nolimits_{s_1} \right| + \Gamma(S_2) \log \left| \sum\nolimits_{s_2} \right| - \Gamma(S_0) \log \left| \sum\nolimits_{s_0} \right| \right) +$$

$$K \log V$$

For example, in the case of $\Delta < 0$, the standard pattern adjustment means 203 performs expansion of the parent nodes, and in the case of $\Delta > 0$, the standard pattern adjustment means 203 does not perform expansion.

When expansion is performed, for the further nodes $S_1$ and $S_2$ there is a repetition of the calculation of the amount of change in description length when expansion is done and a judgment as to whether or not to perform expansion.

After completion of expansion to all nodes, the set of nodes at the extreme end becomes the cut, the node distribution of which is selected as the element distribution.

Then a mixed Gaussian distribution HMM having the newly selected distribution only as an element distribution is generated, this element distribution being learned by data during the learning.

The foregoing is a description of an embodiment of the present invention shown in FIG. 1.

Although the description above is for the example of using a hidden Markov model (HMM), it will be understood that application is easy as well in the case in which the model is a mixed Gaussian distribution.

In the foregoing description of an embodiment of the present invention, although the example was that of acoustic model learning, even in the case of speaker adaptation, in which a small amount of speech from a speaker is used to correct the standard patterns, it is possible to use speaker adaptation data to adjust the number of element distributions.

In the above-noted case, rather than using a standard pattern generating means in the speech recognition apparatus, a standard pattern correction means is used, the input speech to the standard pattern correction means being speech from the same speaker used for the input pattern generating means for recognition.

Although the foregoing description of a speech recognition apparatus according to the embodiment of the present invention described above is with regard to an adjustment means for the number of element distributions using a tree structure, it is also possible to perform adjustment using a minimax distribution selection means that employs the minimax method, this condition being described below.

First, a set of distributions occurring above a prescribed number of times (×times) in the learning data is taken as the set A, with other distributions being the set B.

All the distances between distributions belonging to A and distributions belonging to B are calculated, and of the B distributions the distance from the distribution in A that is the greatest to the closest distribution in A is eliminated.

Of the remaining distributions in B, the distribution having the greatest distance from the distribution that is the closest in A is eliminated.

The procedure is repeated until a prescribed minimum number of distributions is reached.

When the number of distributions does not fall below the minimum number of distributions (that is, when the number of B distributions is smaller), the above-noted noted processing is stopped at this point.

Although the above-noted embodiment uses an MDL criterion for node selection, it is also possible to use a data volume threshold value. That is, the set of distributions that is the closest to a leaf of distributions having an amount of data greater than some threshold value is taken as the cut.

Additionally, although the above-noted embodiment uses an MDL criterion as the amount of data criterion, application is also easily done in the case of using the Akaike information criterion or another similar information amount criterion.

Additionally, although the embodiment of the present invention is described for the case in which the divergence is used as the inter-distribution distance, it is alternatively possible to use the amount of increase in likelihood with shared distributions as the distance value.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

According to a speech recognition apparatus of the present invention, by using a newly added parameter adjustment means, in pattern recognition using a mixed Gaussian distribution, the number of element distributions of standard speech patterns is optimized for each state of the HMM. That is, by adjusting the number of element distributions so that the recognition performance for each state of the HMM is made high, deterioration with respect to unknown data caused by over-learning is prevented, thereby enabling high-performance speech recognition.

What is claimed is:

1. A speech recognition apparatus using a probability model that employs a mixed distribution, said apparatus comprising:

standard pattern storage means for storing a standard pattern of a Hidden Markov Model (HMM) having a plurality of states;

recognition means for outputting recognition results corresponding to an input speech by using said standard pattern;

standard pattern generating means for inputting learning speech and generating said standard pattern; and standard pattern adjustment means, provided between said standard pattern generating means and said standard pattern storage means, for adjusting the number of element distributions of said mixed distribution of said standard pattern;

wherein said standard pattern adjustment means comprising:

tree structure generating means for generating a tree structure of element distributions for each state of the HMM, and element distribution selection means for adjusting the number of element distributions of said mixed distribution of said standard pattern for each state of the HMM by selecting element distributions to leaves in said standard pattern by using said tree structure generated by said tree structure generating means after generation of said tree structure, wherein the standard pattern adjustment means calculates a description length for all possible cuts that can be made on the tree structure of element distributions, and wherein the standard pattern adjustment means selects one of the cuts having a minimum description length, in order to divide the tree structure of element distributions into a top part and a bottom part, separated by the one of the cuts.

2. The speech recognition apparatus according to claim 1, wherein said standard pattern adjustment means having a minimax distribution selection means for selecting element distributions by using a minimax method.

3. The speech recognition apparatus according to claim 1, wherein said element distribution selection means uses an amount of learning data corresponding to each element distribution as a criterion in selection of element distributions.

4. The speech recognition apparatus according to claim 1, wherein said element distribution selection means uses a minimum description length as a criterion in selection of element distributions.

5. The speech recognition apparatus according to claim 4, wherein said minimum description length is computed by said element distribution selection means by computing an equation that corresponds to a sum of: a) a logarithmic likelihood with respect to data, b) a logarithmic value corresponding to a complexity of a selected model, and c) a logarithmic description length necessary for the selected model.

6. The speech recognition apparatus according to claim 5, wherein said minimum description length is computed according to the following equation:

$$I_{MDL(i)} = -\log P_{\hat{\theta}(i)}(X^N) + \frac{\alpha_i}{2}\log N + \log I,$$

wherein $\alpha_i$ is the dimension of the model i, and $\theta(i)$ is the likelihood prediction value of a free parameter $\theta^{(i)} = (\theta_1^{(i)}, \ldots, \theta\alpha_i^{(i)})$ of a model i predicted using data $X^N$.

7. The speech recognition apparatus according to claim 1, wherein said element distribution selection means uses an Akaike information criterion as a criterion in selection of element distributions.

8. The speech recognition apparatus according to claim 1, wherein said tree structure generating means uses divergence as an inter-distribution distance.

9. The speech recognition apparatus according to claim 1, wherein said tree structure generating means uses a likelihood with respect to learning data as an inter-distribution distance.

10. The speech recognition apparatus according to claim 1, wherein a hidden Markov model is used as said probability model.

11. A speech recognition apparatus according to claim 1, wherein the tree structure generated by said tree structure generating means includes a root node representing a single distribution and leaf nodes representing each of the element distributions, and said element distribution selection means comprises:

variance determining means for detecting a variance of distributions at each node of the tree structure, wherein the variance of distributions is determined from an occupying frequency and Gaussian distribution parameters of distributions of all leaves which govern the variance.

12. The speech recognition apparatus according to claim 1, wherein a bifurcated tree is obtained due to the dividing of the tree structure of element distributions, wherein the standard pattern adjustment means determines an amount of change in distribution length at a time of expansion from a root node to child nodes, and wherein when the amount of change in distribution length is greater than zero, no expansion of parent nodes in the tree structure is performed, and wherein when the amount of change in distribution length is less than zero, expansion of the parent nodes in the tree structure is performed.

13. A method of controlling a speech recognition apparatus using a probability model that employs a mixed distribution, comprising the steps of:

storing a standard pattern of a Hidden Markov Model (HMM) having a plurality of states by using a standard pattern storage means;

outputting recognition results corresponding to an input speech with said standard pattern by using a recognition means;

inputting learning speech and generating said standard pattern by using a standard pattern generating means; and adjusting a number of element distributions of said mixed distribution of said standard pattern by using a standard pattern adjustment means that is provided between said standard pattern generating means and said standard pattern storage means;

generating a tree structure of element distributions for each state of the HMM by using a tree structure generating means; and wherein the adjusting step comprises adjusting the number of element distributions of said mixed distribution of said standard pattern for each state of the HMM by selecting element distributions to leaves in said standard pattern by using said tree structure generated by said tree structure generating means after generation of said tree structure, wherein the adjusting step further comprises:

calculating a description length for all possible cuts that can be made on the tree structure of element distributions;

selecting one of the cuts having a minimum description length; and dividing the tree structure of element distributions into a top part and a bottom part, separated by the one of the cuts.

14. The method according to claim 13, further comprising:

obtaining a bifurcated tree by dividing of the tree structure of element distributions;

determining an amount of change in distribution length at a time of expansion from a root node to child nodes;

when the amount of change in distribution length is greater than zero, not expanding parent nodes in the tree structure; and when the amount of change in distribution length is less than zero, expanding the parent nodes in the tree structure.

* * * * *

UNITED STATES PATENT AND TRADEMARK OFFICE
CERTIFICATE OF CORRECTION

| | | |
|---|---|---|
| PATENT NO. | : 7,437,288 B2 | Page 1 of 1 |
| APPLICATION NO. | : 10/093915 | |
| DATED | : October 14, 2008 | |
| INVENTOR(S) | : Shinoda | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 739 days Delete the phrase "by 739 days" and insert -- by 1370 days --

Signed and Sealed this

Third Day of August, 2010

David J. Kappos
*Director of the United States Patent and Trademark Office*